United States Patent [19]

Freud et al.

[11] Patent Number: 5,094,526
[45] Date of Patent: Mar. 10, 1992

[54] INTEGRATED OPTICAL WAVEGUIDE DOPPLER VELOCIMETER

[75] Inventors: Paul J. Freud, Furlong; Michael N. Trainer, Telford, both of Pa.

[73] Assignee: General Signal Corporation, Stamford, Conn.

[21] Appl. No.: 610,471

[22] Filed: Nov. 7, 1990

[51] Int. Cl.$^5$ .................................................. G01P 3/36
[52] U.S. Cl. ................................. 356/28.5; 385/8; 385/14; 385/15; 385/33
[58] Field of Search ............................ 358/28, 28.5; 350/96.11, 96.12, 96.13, 96.14, 96.18, 96.31; 385/14, 8, 15, 33

[56] References Cited

U.S. PATENT DOCUMENTS

| | | |
|---|---|---|
| 3,719,462 | 3/1973 | Andreatch, Jr. et al. . |
| 4,090,776 | 5/1978 | Bernal et al. . |
| 4,111,520 | 9/1978 | Bernal . |
| 4,120,588 | 10/1978 | Chaum . |
| 4,468,085 | 8/1984 | Papuchon et al. . |
| 4,515,430 | 5/1985 | Johnson . |
| 4,552,456 | 11/1985 | Endo ........................... 356/28.5 X |
| 4,579,417 | 4/1986 | Ih . |
| 4,637,716 | 1/1987 | Auweter et al. . |
| 4,666,236 | 5/1987 | Mikami et al. . |
| 4,674,827 | 6/1987 | Izutsu et al. . |
| 4,679,892 | 7/1987 | Haisma et al. . |
| 4,756,588 | 7/1988 | Granestrand . |
| 4,772,084 | 9/1988 | Bogert . |
| 4,813,757 | 3/1989 | Sakano et al. . |
| 4,818,071 | 4/1989 | Dyott . |
| 4,849,760 | 7/1989 | Solie . |
| 4,906,092 | 3/1990 | O'Meara ........................... 356/28.5 |
| 4,990,791 | 2/1991 | Nishi ................................. 356/28.5 |

Primary Examiner—Stephen C. Buczinski
Attorney, Agent, or Firm—Milton E. Kleinman; William G. Miller

[57] ABSTRACT

A Doppler velocimeter for measuring the doppler frequency shift of light scattered from particles suspended in a medium. The velocimeter includes a light source and an integrated optical waveguide having a first optical waveguide path for receiving an incident beam of light from the light source at one end. The first waveguide path further guides the incident beam to a second end which is located in the medium adjacent the particles. A second optical waveguide path is optically coupled to the first waveguide path for receiving the scattered light from the particles as well as the non-scattered light and guiding both to the other end thereof. A detector receives the scattered and non-scattered light from the second waveguide and converts it to an electrical signal indicative of the doppler frequency shift.

14 Claims, 5 Drawing Sheets

INTEGRATED OPTICAL WAVEGUIDE DOPPLER VELOCIMETER

BACKGROUND OF THE PRESENT INVENTION

The present invention relates generally to the field of measuring the size and velocity of particles suspended in a fluid medium and more particularly to laser Doppler velocimeters used for transmitting light to and from the measurement zone.

In U.S. patent application Ser. No. 07/432,710 entitled, "Method and Apparatus For Measuring Small Particle Size Distribution" filed by Michael N. Trainer, William Leslie Wilcock and Brian M. Ence and assigned to General Signal Corporation, the assignee of this application, a method and apparatus is described for measuring the size distribution of very small particles. The apparatus described includes a dynamic scattering instrument having an optical coupler. The integrated optical waveguide Doppler velocimeter of the present invention is especially useful in such an apparatus and method. As described in U.S. application Ser. No. 07/432,710, fiber optic Doppler anemometers of the type disclosed in U.S. Pat. No. 4,637,716 to Auweter et al and U.S. Pat. No. 4,818,071 to Dyott are also quite useful in such an apparatus and method. However, applicants have discovered that it would be desirable to have an optical device in such an environment which is more rugged than fiber optic couplers, which reduce environmentally induced optical phase noise, provides better polarization stability than a fiber optic coupler, and provides an increased signal to noise ratio when compared with a fiber optic coupler. Applicants further discovered that it would be desirable to provide an optical device which could be easily integrated with other optical devices such as frequency shifters and modulators. Heretofore there has been no known device for providing such advantages.

SUMMARY OF THE INVENTION

Accordingly, a Doppler velocimeter is provided which includes a light source and an integrated optical waveguide having a first optical waveguide path for receiving an incident beam of light from the light source at one end. The first waveguide path further guides the incident beam to a second end which is located adjacent bodies having moving surfaces to be measured and receives light reflected by the moving surfaces. A surface optical waveguide path is optically coupled to the first waveguide path for receiving the reflected light from the moving surfaces and guiding it to the other end thereof. A detector receives the reflected light from the second waveguide and converts it to an electrical signal.

OBJECTS OF THE INVENTION

Accordingly, an object of the present invention is the provision of a Doppler velocimeter for measuring the velocity and size of particles suspended in a fluid wherein the velocimeter exhibits greater mechanical strength and stability than fiber optic devices heretofore available.

Another object of the present invention is the provision of a Doppler velocimeter which exhibits greater immunity to acoustic noise than fiber optic devices heretofore available.

A further object of the present invention is the provision of a Doppler velocimeter which minimizes the distance between the particles being measured and the optical coupling between the incident light and the reflected light.

A still further object of the present invention is the provision of a Doppler velocimeter which minimizes the amount of light lost within the velocimeter.

Other objects, advantages and novel features of the present invention will become apparent from the following detailed description of the invention when considered in conjunction with the accompanying drawings.

DESCRIPTION OF THE PREFERRED EMBODIMENT

Figure 1:
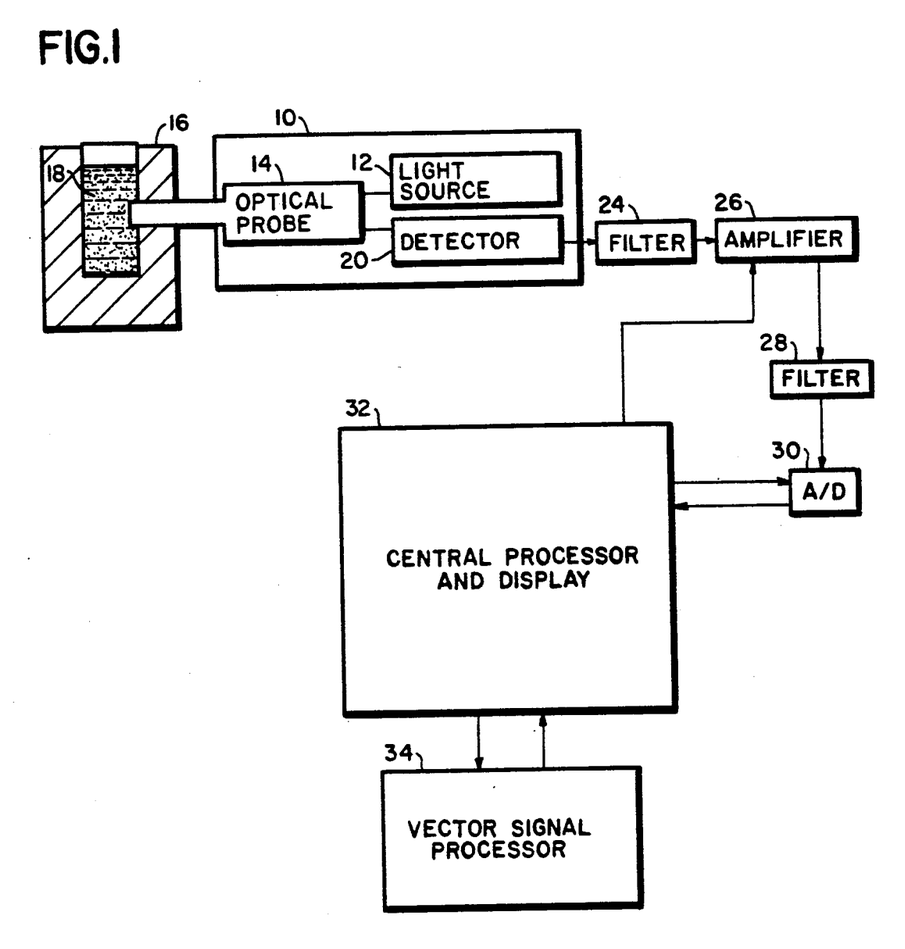
FIG. 1 shows in block diagram form the Doppler velocimeter of the present invention as part of an apparatus for measuring particle size and distribution.

Referring to FIG. 1, the Doppler velocimeter of the present invention is shown in block diagram form as part of an apparatus for measuring small particle size distribution as described more particularly in aforementioned U.S. patent application, Ser. No. 07/432,710. A Doppler velocimeter 10 includes a laser diode light source 12 which transmits a beam of light into an optical probe 14. The optical probe 14 is mounted in the side of a sample cell 16 holding particulate matter 18 suspended in a medium, such as water. The particular medium may be selected from a wide range of media as long as it is inert with respect to the particulate matter suspended therein. Although the probe may be mounted in a number of different positions, in a preferred embodiment it is mounted horizontally in the side wall of the sample cell 18 so that the end of the probe is adjacent the medium having moving surfaces therein to be measured.

The size distribution of the particulate matter 18 is determined by measuring the Brownian motion of that particulate matter. As used herein, the term "size distribution" includes number, volume and area distribution. Median velocities for typical particles between 0.005 and 2 microns in diameter is on the order of 6000 to 15 microns per second. Such velocities change direction and amplitude continuously, resulting in very small cumulative motion. Light scattering has proven to be the best method to measure such small motions. Light scattered from each particle is Doppler shifted by the particle motion. These Doppler frequency shifts, ranging from a few Hz to several kHz are proportional to the instantaneous particle velocity. Using frequency beating techniques, it is known that one can measure such small frequency shifts which are twelve orders of magnitude smaller than the optical frequency itself.

As will be further described in connection with the description of the probe 14, light is scattered back by the particles 18 into the probe 14. In addition, due to the refractive index difference between the glass in the optical probe 14 and the medium, a small portion of the light emitted from the probe 14 is also Fresnel reflected back into the probe 14. The Fresnel reflected signal has the optical frequency of the laser diode source 12 and is compared to the frequency of the scattered light from the particles 18. This comparison is made possible since the scattered light is Doppler frequency shifted from the source frequency by the Brownian motion of the particles 18. The scattered and nonscattered signals are guided back through the probe 14 to a photodiode detector and amplifier 20.

The detector 20 generates a signal the magnitude of which varies with time and is indicative of the difference in frequency between the scattered light and the nonscattered light. This is accomplished since the detector 22 has a quadratic response which mixes (homodynes) the shifted and nonshifted light signals in a nonlinear fashion thus creating a beat frequency equal to the Doppler shift of these two signals. The output signal from detector 20 is transmitted to a direct current blocking filter 24 to remove the direct current component of the signal that is introduced by the detector 20. The output from filter 24 is amplified by a low noise amplifier 26 having a gain which is selectable. The output of amplifier 26 is connected to a filter 28 whose output is in turn connected to an analog to digital converter 30. The filter 28 is preferably a 20 kHz active filter which serves as an anti-aliasing filter for the analog to digital converter 30. The filter 28 serves to remove all frequency components of the signal which are above $\frac{1}{2}$ the sampling rate. If such components are not removed they introduce an error into the end result by appearing to the system to be signals within the frequency range of interest. The analog to digital converter 30 converts the analog signal amplified at amplifier 26 and filtered in filter 28 into a format that can be easily processed by computer. The analog to digital converter 30 preferably operates at a sampling rate of 50 kHz.

The analog to digital converter 30 is connected to a central processor 32. The central processor 32 is preferably an IBM compatible personal computer. Also connected to the central process 32 is a vector signal processor 34 preferably of the type manufactured by Burr-Brown under Model No. ZPB32-H5. The signal processor 34 generates a signal which represents the power spectrum of the signal delivered to the computer 32 by the analog to digital converter 30. The central processor 32 includes a display and serves to gather data from the analog to digital converter 30, control the vector signal processor 34 and display the size distribution.

Figure 2A:
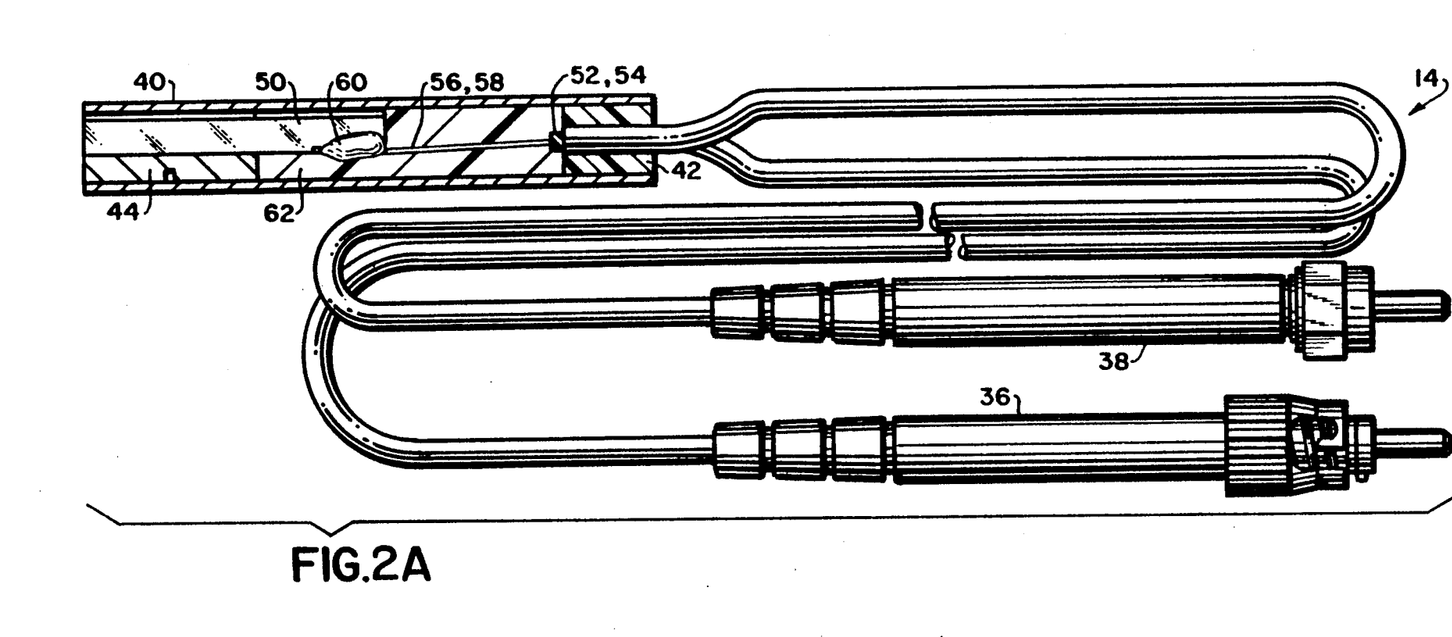
FIG. 2A shows in partial cross-section, a probe and fiber optic cable assembly forming a part of the Doppler velocimeter of the present invention.
Figure 2B:
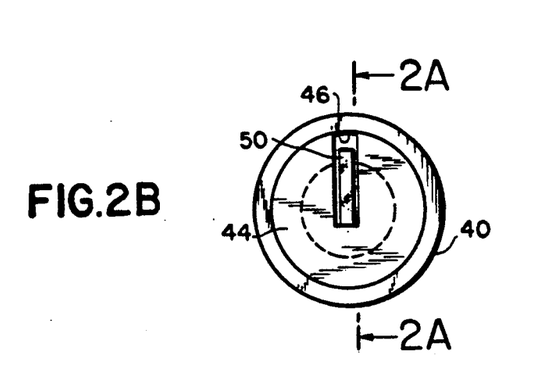
FIG. 2B shows an end perspective view of the probe shown in FIG. 2A.
Figure 3A:
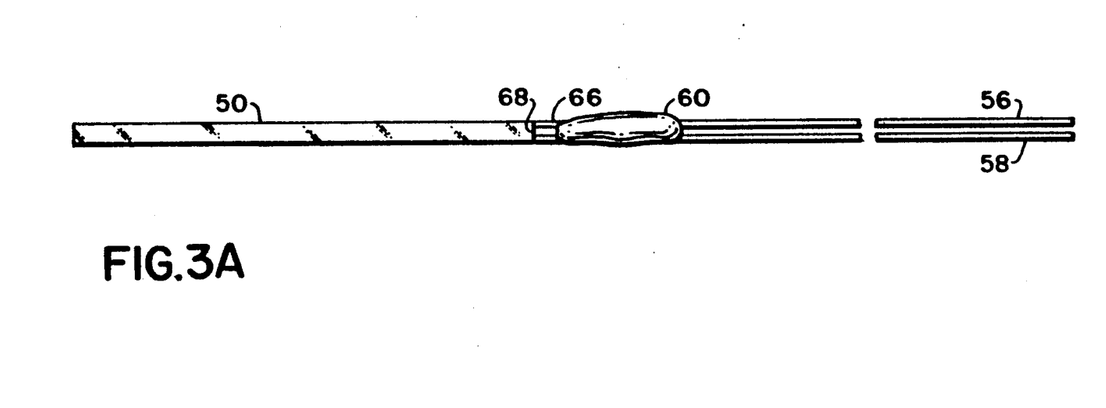
FIGS. 3A and 3B show a top and side perspective view of an integrated optical waveguide forming a part of the probe shown in FIG. 2.
Figure 3B:
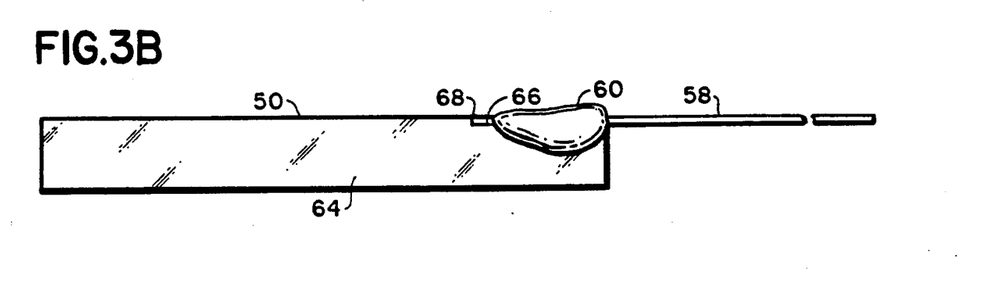

Referring to FIG. 2a, the probe assembly 14 includes a fiber optic cable 36 adapted to receive an incident beam of light from the light source 12 and a fiber optic cable 38 for delivering the reflected light signal to detector 20. The probe assembly 14 further includes a tubular housing 40 preferably made of stainless steel, for protecting all delicate probe components. A suitable hard epoxy compound 42 bonds the end of the fiber optic cables 36 and 38 within the housing 40 and provides a stress relief for cables 36 and 38. A stainless steel support piece 44 is engaged in a force fitting relationship at the other end of housing 40 and includes a slot 46 extending the length thereof. An integrated optical waveguide 50 shown in detail in FIGS. 3A and 3B is supported within the slot 46 by support member 44. As used herein, the term "integrated optical waveguide" is intended to mean one or more optical waveguide paths supported by and integral with a common substrate. A pair of polyester tubes 52 and 54 extend from the cables 36 and 38 respectively. In addition, optical fibers 56 and 58 contained within the tubes 52 and 54 respectively are secured to the integrated optical waveguide 50 by an epoxy cement 60. A silicone grease 62 fills the center of the housing 40 to protect the internal components from moisture. The integrated optical waveguide is preferably of the type which may be obtained commercially from Corning Glass Works, Telecommunications Products Division (Part No. MGC2010). The waveguide 50 includes a glass substrate 64 having a notched portion 66 at one end thereof. The optical fibers 56 and 58 are supported by the notch 66 and secured thereto by epoxy 60 so that the ends of the fibers 56 and 58 abut the shoulder 68 at the end of the notch 66. As shown in schematic form in FIG. 4, the integrated optical waveguide 50 includes a first optical waveguide path 70 connected to optical fiber 56, for receiving an incident beam of light from light source 12 at the end of path 70 abutting fiber 56. The path 70 serves to guide the incident beam to the other end 72 of waveguide 50 which is positioned within sample cell 18 adjacent particles whose motion is to be measured. A second optical waveguide path 74 is optically coupled to path 70 at the portion abutting end 72 so that said first and second waveguides form a Y-shaped configuration. The path 74 receives the scattered light from the moving particles and the Fresnel reflected light from the coupled end of the paths 70 and 74 and guides both the scattered and non-scattered light to the other end thereof and to optical fiber 58 for delivery to detector 20.

Figure 4:
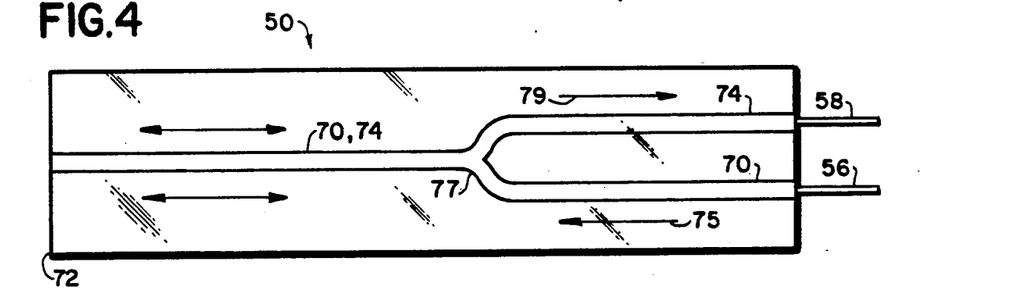
FIG. 4 shows in schematic form the preferred embodiment of the integrated optical waveguide shown in FIGS. 3A and 3B.

It should be noted that the portion of paths 70 and 74 at the ends connected to light source 56 and detector 58 are utilized for unidirectional signal transmission only and are independent of each other, i.e. uncoupled. The paths 70 and 74 may be either single or multimode waveguides. Thus the signal delivered from light source 12 along fiber 56 to path 70 travels in the direction of arrow 75 to end 72. The scattered signal from end 72 and the Fresnel reflected signal are split at junction 77 and delivered to path 74 in the direction of arrow 79.

Figure 5:
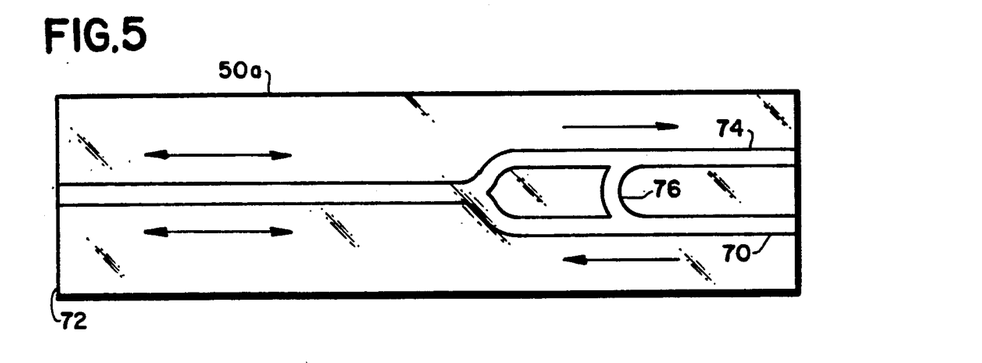
FIG. 5 shows in schematic form an alternate embodiment of an integrated optical waveguide useful with the Doppler velocimeter of the present invention.

FIG. 5 shows an optical coupler 50a which differs from the optical coupler 50 in that a waveguide coupling path 76 couples the waveguides 70 and 74 for increasing the level of the reflected signal received by the detector 20. In this manner the level of the signal received by the detector may be increased by a factor of as much as twenty, thereby further minimizing the effects of any noise.

Figure 6:
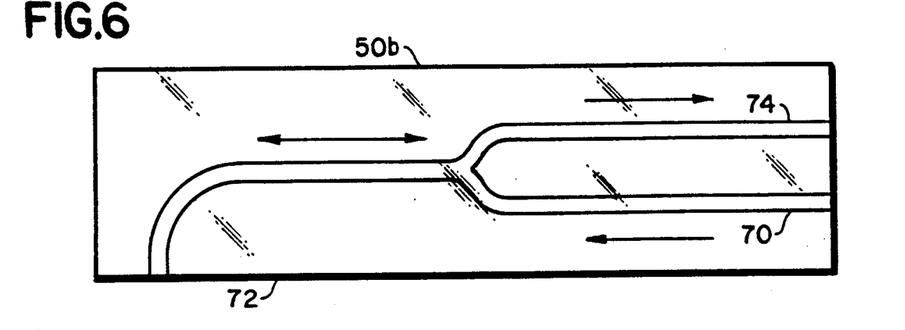
FIG. 6 shows in schematic form another alternate embodiment of an integrated optical waveguide for use in the Doppler velocimeter of the present invention.

FIG. 6 shows another integrated optical waveguide 50b which is identical to the waveguide 50 in all respects except that the coupled portion of the waveguide path forming the base of the Y-shaped configuration is curved through an arc of 90 degrees so that light reflected by the moving particles is initially received perpendicular to the incident beam of light. This configuration is particularly useful if the optical probe of the present invention is to be inserted in a vertical orientation in the sample cell 16 to minimize the effects of particle settling.

Figure 7:
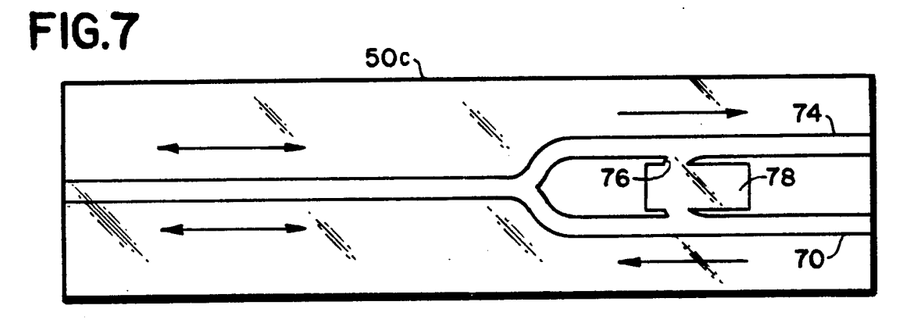
FIG. 7 shows in schematic form another embodiment of an integrated optical waveguide which may be used in the Doppler velocimeter of the present invention.

FIG. 7 shows an integrated optical waveguide 50c which is identical in all respects to the coupler 50a shown in FIG. 5 with the exception that an electro-optic or acousto-optic frequency shifter 78 is inserted in the coupling path 76. It has been found in the measurement of relatively large particles the reciprocal of the frequency signal or 1/f noise caused by the temperature fluctuation of electronics in the detector 20 has a deleterious effect on the accuracy of detector 20. In such a case the use of a frequency shifter, of for example 1000 HZ, will shift the entire power spectrum well above the 1/f noise region thereby eliminating this potential problem.

Figure 8:
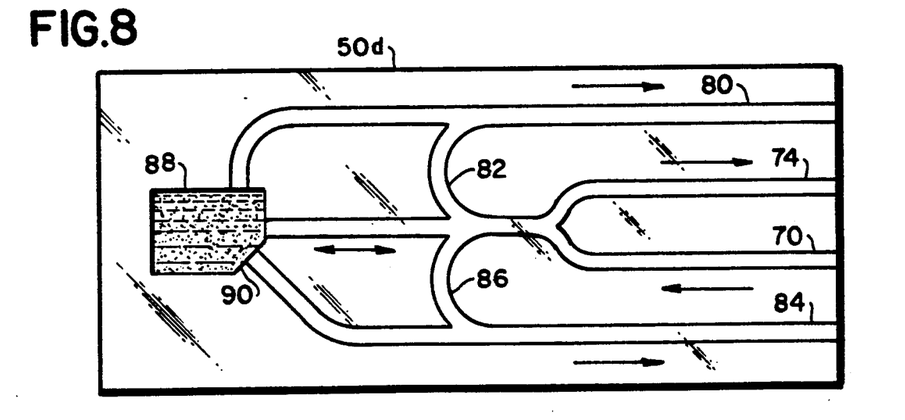
FIG. 8 shows in schematic form another embodiment of an integrated optical waveguide of the present invention.

FIG. 8 shows an integrated optical waveguide 50d further including a waveguide path 80 coupled to paths 70 and 74 by a waveguide path 82 and another waveguide path 84 coupled to paths 70 and 74 by a waveguide path 86. The waveguide 50d includes an etched recess 88 forming a sample chamber in the glass substrate. The sample chamber is rectangular in cross section with a corner 90 truncated at a 45 degree angle. The path 80 is curved at one end thereof to receive scattered light from the sample chamber at 90 degrees with respect to the beam of incident light introduced on path 70. The paths 70 and 74 abut the sample chamber 88 so as to receive scattered light at 180 degrees with respect to the incident light on path 70. The path 84 is curved at one end thereof to abut the sample chamber at surface 90 so as to receive scattered light at 45 degrees with respect to the incident light received on path 70. The paths 80, 74 and 84 are each connected to separate detectors. In this embodiment since Doppler shift is measured at multiple scattering angles an inherent means is provided for correcting optic scattering coefficients.

Figure 9:
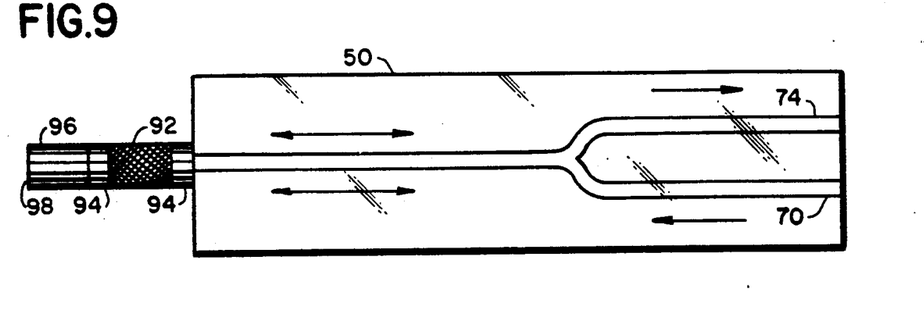
FIG. 9 shows in schematic form an alternate embodiment of the integrated optical waveguide shown in FIG. 4.

In order to increase the field of view and the sample scattering volume of the coupled portion of paths 70 and 74, a grin rod 92 may be secured to the end 72 of the waveguide 50 through the use of an index matching epoxy 94 as shown in FIG. 9. In order to avoid the deleterious effects of inserting the grin rod 92 into a moisture filled environment, a glass rod 96 is preferably secured to the other end of the grin rod 92, also utilizing the index matching epoxy 94. By way of example, if the index of refraction of the waveguides 70 and 74 is 148, a suitable epoxy may have an index refraction of 1.56, a grin rod, an index of refraction of between 1.55 and 1.60 and the glass rod 96, an index of refraction of 1.48. This compares for example to the index of refraction of water at 1.33 as contained in the sample cell 16. By matching the indices of refraction in the above example, any reflection between interfacing surfaces is minimized and the end 98 of the glass rod 96 is relied upon for Fresnel reflection. This embodiment permits a larger sampling volume to be viewed by the probe 14 and allows for a better averaging of particle statistics when samples containing large particles are being measured.

Figure 10:
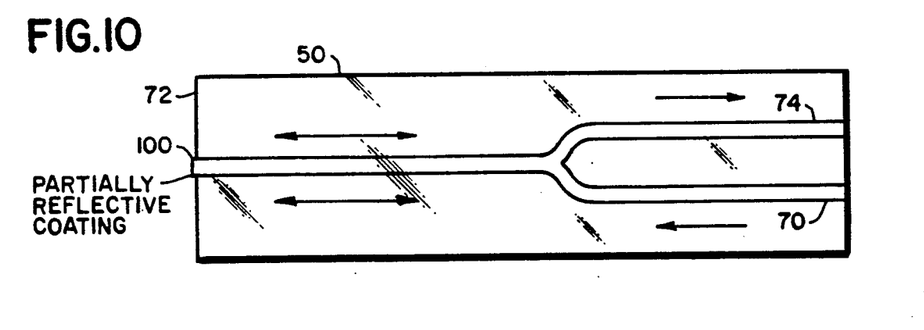
FIG. 10 shows in schematic form another embodiment of the integrated optical waveguide shown in FIG. 4.

FIG. 10 shows an embodiment of the coupler 50 in which the reflected light signal level is increased approximately one hundred times by coating the end of the waveguides 70 and 74 at end 72 with a partially reflecting coating 100. This partially reflective coating may be recessed within the glass substrate 50 if desired.

Figure 11:
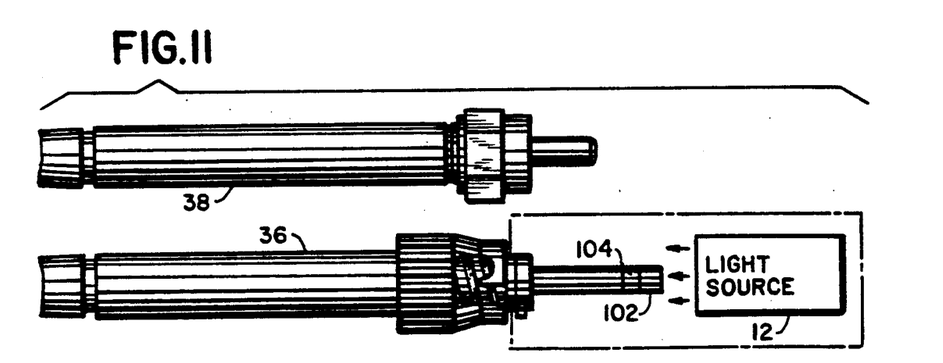
FIG. 11 shows in partial schematic form another embodiment of the Doppler velocimeter of the present invention.

In those instances where one chooses to use a laser light source as the light source 12, in order to prevent the deleterious effects of reflected light on the laser itself, an optical spacer 102 may be placed on the end of fiber optic cable 36 as shown in FIG. 11. The spacer 102 is preferably secured to the cable 36 by means of an index matching epoxy 104.

Thus it is clear that the Doppler velocimeter of the present invention is quite rugged in construction providing a high degree of mechanical strength and stability. The velocimeter of the present invention also provides high immunity to acoustic noise, minimizes the distance between the particles being measured and the optical coupling between the incident and reflected light, and further minimizes the amount of light lost within the velocimeter.

While there have been described what are at the present considered to be the preferred embodiments of the present invention, it will be obvious to those skilled in the art that various changes and modifications may be made therein, without departing from the invention, and it is therefore aimed in the appended claims to cover all such changes and modifications as fall within the true spirit and scope of the present invention.

What is claimed is:

1. A Doppler velocimeter for measuring the doppler frequency shift of light scattered from particles suspended in a medium comprising:
   a light source;
   an integrated optical waveguide including
      a first optical waveguide path for receiving an incident beam of light from said light source at one end thereof, guiding said incident beam to a second end thereof which is adapted to be located in said medium adjacent said suspended particles and is curved so that light reflected from said particles is initially received perpendicular to the said incident beam of light,
      a second optical waveguide path optically coupled to said first path for receiving light scattered by said particles as well as non-scattered light, said second path guiding said non-scattered light and said scattered light to an end thereof which is independent of said first path, and
      a waveguide coupling path between said first and second waveguide paths for increasing the level of said non-scattered light received at the independent end of said second path; and
   a detector for receiving said scattered and non-scattered light from said end of said second waveguide path and converting said scattered and non-scattered light to an electrical signal indicative of said doppler frequency shift.

2. A velocimeter as set forth in claim 1 wherein said coupling path includes means for shifting the frequency of said incident light beam.

3. A velocimeter as set forth in claim 2 wherein said frequency shifting means is electro-optic.

4. A velocimeter as set forth in claim 3 wherein said frequency shifting means is acousto-optic.

5. A Doppler velocimeter for measuring the doppler frequency shift of light scattered from particles suspended in a medium comprising:
a light source;
an integrated optical waveguide including
a sample chamber for containing said medium with said suspended particles,
a first optical waveguide path for receiving an incident beam of light from said light source at one end thereof, guiding said incident beam to a second end thereof which is adapted to be located in said medium adjacent said suspended particles,
a second optical waveguide path optically coupled to said first path for receiving light scattered by said particles as well as non-scattered light, said second path guiding said scattered light and said non-scattered light to an end thereof which is independent of said first path,
third and fourth waveguide paths for receiving said scattered light at a plurality of scattering angles,
means coupling said first, second, third and fourth waveguide paths as an integral part of said chamber; and
detector means for receiving said scattered and non-scattered light from said end of said second waveguide path and from said third and fourth waveguide paths and converting said scattered and non-scattered light to an electrical signal indicative of said doppler frequency shift.

6. A velocimeter as set forth in claim 5 wherein said waveguide paths are adapted to receive scattered light at 45 degrees, 90 degrees and 180 degrees with respect to said incident beam of light.

7. A Doppler velocimeter for measuring the doppler frequency shift of light scattered from particles suspended in a medium comprising:
a light source;
an integrated optical waveguide including
a first optical waveguide path for receiving an incident beam of light from said light source at one end thereof, guiding said incident beam to a second end thereof which is adapted to be located in said medium adjacent said suspended particles, and
a second optical waveguide path optically coupled to said first path for receiving light scattered by said particles as well as non-scattered light, said second path guiding said reflected light to an end thereof which is independent of said first path;
a partially reflecting film on the end of said waveguide paths adapted to be located in said medium for increasing the level of said non-scattered light received at the independent end of said second path; and
a detector for receiving said scattered and non-scattered light from said end of said second waveguide path and converting said scattered and non-scattered light to an electrical signal indicative of said doppler frequency shift.

8. A velocimeter as set forth in claim 7 further including means connected to said one end of said first waveguide path for preventing said incident beam of light from being reflected toward said light source.

9. A Doppler velocimeter for measuring the doppler frequency shift of light scattered from particles suspended in a medium comprising:
a light source;
an integrated optical waveguide including
a first optical waveguide path for receiving an incident beam of light from said light source at one end thereof, guiding said incident beam to a second end thereof, and
a second optical waveguide path optically coupled to said first path for receiving light scattered by said particles as well as non-scattered light, said second path guiding said scattered and non-scattered light to an end thereof which is independent of said first path;
a grin rod secured to said second end for increasing the field of view;
a housing surrounding said substrate and supporting said substrate therein;
a pair of optical fibers connected to said first and second waveguide paths respectively and supported within said housing; and
a detector for receiving said scattered and non-scattered light from said end of said second waveguide path by way of one of said optical fibers and converting said scattered and non-scattered light to an electrical signal indicative of said doppler frequency shift.

10. A Doppler Velocimeter for measuring the doppler frequency shift of light scattered from particles suspended in a medium comprising:
a light source;
an optical device including
a first optical path for receiving an incident beam of light from said light source at one end thereof, guiding said incident beam to a second end thereof, and
a second optical path optically coupled to said first path for receiving light scattered by said particles as well as non-scattered light, said second path guiding said scattered and non-scattered light to an end thereof which is independent of said first path;
a grin rod secured to said second end for increasing the field of view; and
a detector for receiving said scattered and non-scattered light from said end of said second waveguide path and converting said scattered and non-scattered light to an electrical signal indicative of said doppler frequency shift.

11. A Doppler velocimeter for measuring the doppler frequency shift of light scattered from particles suspended in a medium comprising:
a light source;
an optical device including
a first optical path for receiving an incident beam of light from said light source at one end thereof, guiding said incident beam to a second end thereof which is adapted to be located in said medium adjacent said suspended particles, and
a second optical path optically coupled to said first path for receiving light scattered by said particles as well as non-scattered light, said second path guiding said reflected light to an end thereof which is independent of said first path;
a partially reflecting film on the end of said paths adapted to be located in said medium for increasing the level of said non-scattered light received at the independent end of said second path; and a detector for receiving said scattered and non-scattered light from said end of said second waveguide path and converting said scattered and non-scattered light to an electrical signal indicative of said doppler frequency shift.

12. A Doppler Velocimeter for measuring the doppler frequency shift of light scattered from particles suspended in a medium comprising:

a light source;

an integrated optical waveguide including a first optical waveguide path for receiving an incident beam of light from said light source at one end thereof, guiding said incident beam to a second end thereof, and a second optical waveguide path optically coupled to said first path for receiving light scattered by said particles as well as non-scattered light, said second path guiding said scattered and non-scattered light to an end thereof which is independent of said first path;

a grin rod secured to said second end for increasing the field of view; and a detector for receiving said scattered and non-scattered light from said end of said second waveguide path and converting said scattered and non-scattered light to an electrical signal indicative of said doppler frequency shift.

13. A Doppler Velocimeter as set forth in claim 12 wherein one end of said grin rod is secured to said second end by index matching epoxy and an opposite end is protected by a glass rod secured to the grin rod by index matching epoxy whereby said glass rod protects the grin rod from exposure to said medium and the particles suspended therein.

14. A Doppler velocimeter for measuring the doppler frequency shift of light scattered from particles suspended in a medium comprising:

a light source;

an integrated optical waveguide including a sample chamber having walls for containing said medium with said suspended particles, a first optical waveguide path for receiving an incident beam of light from said light source at one end thereof, guiding said incident beam to a second end thereof which is exposed to said medium as a part of the walls of said chamber, a second optical waveguide path optically coupled to said first path for receiving light scattered by said particles as well as non-scattered light, said second path guiding said scattered light and said non-scattered light to an end thereof which is independent of said first path, at least one additional waveguide path having an end exposed to said medium as a part of the walls of said chamber so that said additional waveguide path receives said scattered light at a scattering angle different from that for said second optical waveguide path, said second end of said first waveguide path and the part of said second waveguide path coupled to said first waveguide path means coupling said waveguide paths as an integral part of said chamber; and detector means for receiving said scattered and non-scattered light from said end of said second waveguide path and from said third and fourth waveguide paths and converting said scattered and non-scattered light to an electrical signal indicative of said doppler frequency shift.

* * * * *